Dec. 8, 1925.
J. C. WRIGHT
MEASURING AND RECORDING DEVICE
Filed Nov. 2, 1923
1,565,136
2 Sheets-Sheet 1
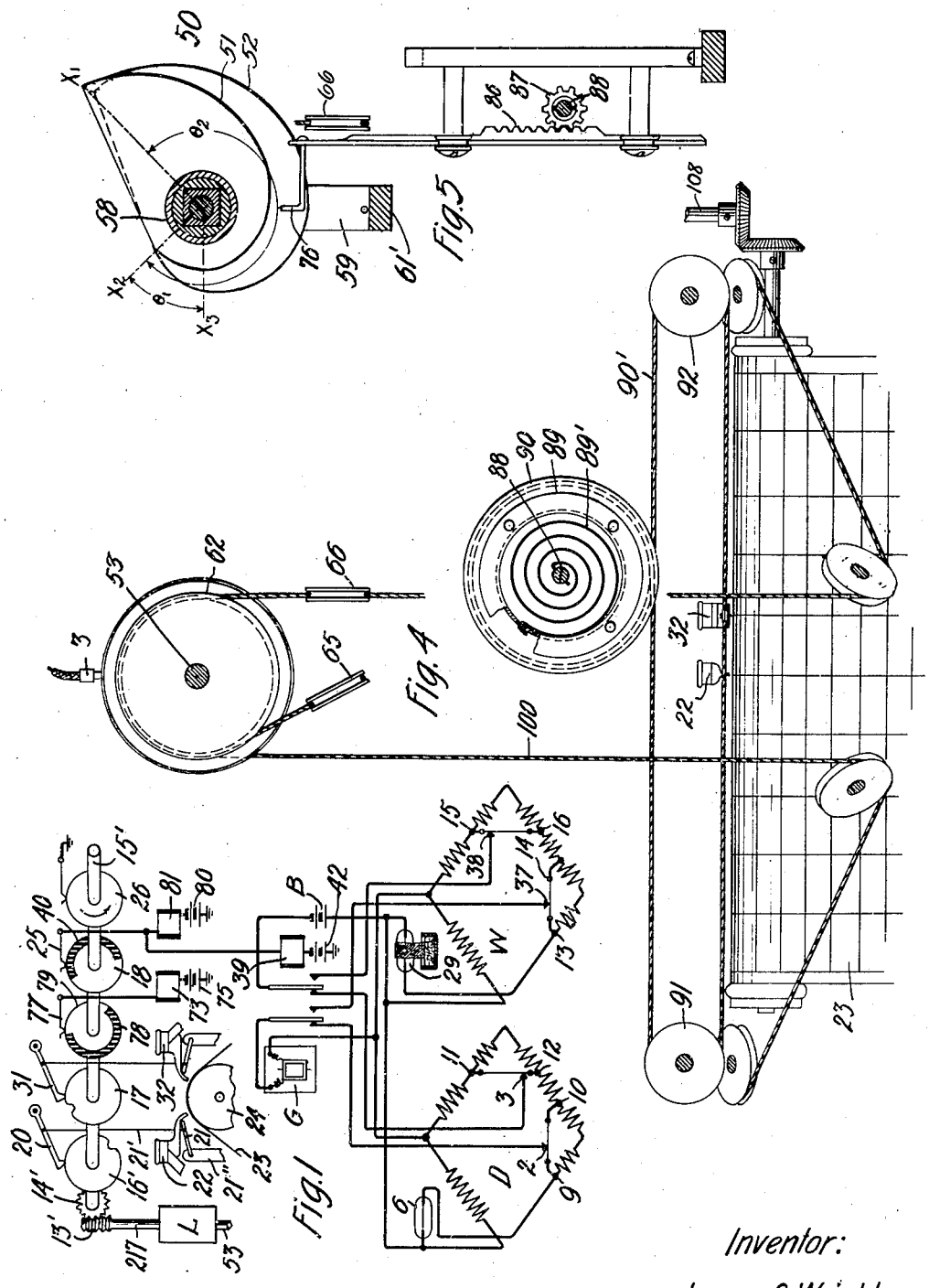
Inventor:
James C. Wright
by E. W. Adam Atty

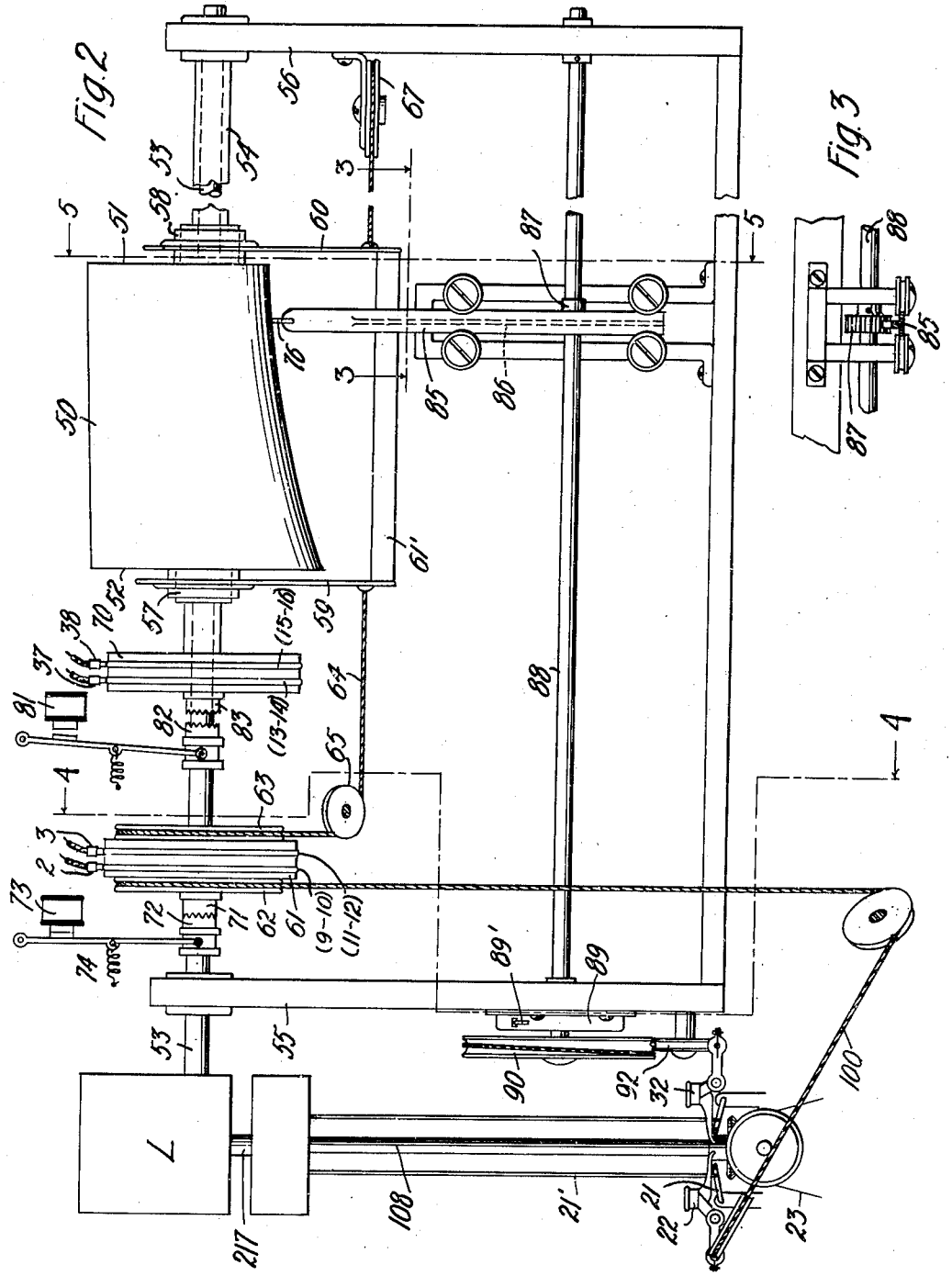

Patented Dec. 8, 1925.

UNITED STATES PATENT OFFICE.

JAMES C. WRIGHT, OF MILLBURN, NEW JERSEY, ASSIGNOR TO WESTERN ELECTRIC COMPANY, INCORPORATED, OF NEW YORK, N. Y., A CORPORATION OF NEW YORK.

MEASURING AND RECORDING DEVICE.

Application filed November 2, 1923. Serial No. 672,321.

*To all whom it may concern:*

Be it known that I, JAMES C. WRIGHT, a citizen of the United States of America, residing at Millburn, in the county of Essex and State of New Jersey, have invented certain new and useful Improvements in Measuring and Recording Devices, of which the following is a full, clear, concise, and exact description.

This invention relates to measuring and recording devices being particularly applicable to a device for continuously measuring and recording values of relative humidity.

The object of the invention is in general, to provide an improved and simplified apparatus for automatically measuring relative humidity and to provide means for recording the measured values, although in its broader aspect the invention is not limited to this application.

Values of relative humidity are usually determined by calculation from the readings of wet bulb and dry bulb thermometers which are exposed to the atmosphere. When it has been desired to obtain a record of relative humidity over a period of time, means have been provided for continuously recording the values of wet and dry bulb temperatures, but with such a record it is necessary to make numerous calculations and plot a third curve to show the variation in relative humidity. By means of the present invention, a curve of relative humidity is plotted directly in accordance with the variations in wet bulb and dry bulb temperatures.

In accordance with the general features of this invention, there is provided a specially shaped cam, the surface of which is plotted from the three coordinates, dry bulb temperatures, wet bulb temperatures and relative humidities. This cam is associated with means for automatically and periodically measuring dry bulb temperature, and wet bulb temperature. As these measurements are made the cam is automatically moved with relation to a pointer so as to position the pointer at the point on the surface of the cam which represents the value of relative humidity corresponding to the measured values of dry bulb temperature and wet bulb temperature. Connected to the pointer is an interpreting and recording mechanism which records the value of relative humidity.

A feature of the invention is the means provided for positioning the cam with respect to the pointer. The cam is mounted on a rotatable square sleeve with respect to which it is longitudinally movable. In response to dry bulb temperature the cam is translated upon the sleeve, and in response to wet bulb temperatures, the sleeve and cam are rotated. The pointer cooperating with the cam surface is free to move only radially with respect to the cam, thus causing it to be positioned radially in accordance with the value of relative humidity corresponding to the measured values of dry bulb temperature and wet bulb temperature.

Referring to the drawings Fig. 1 is a schematic diagram showing the electrical system and the arrangement of the recording device; Fig. 2 is an elevation, partially diagrammatic, showing the mechanical construction of the mechanism; Fig. 3 is a fragmentary section taken on the line 3—3 of Fig. 2; Fig. 4 is a fragmentary section, partially diagrammatic, taken on the line 4—4 of Fig. 2; and Fig. 5 is a fragmentary section taken on the line 5—5 of Fig. 2.

Referring to Fig. 1 there is provided a Wheatstone bridge arranged in the usual form and comprising dry resistance thermometer 6 and balancing slide wires 9—10 and 11—12, the slide wires being preferably of relatively high resistance, shunted by relatively low resistance shunts. This bridge is so arranged that on a movement of points 2 and 3 along the slide wires, in a manner which will be explained later on, the bridge is balanced to measure the dry bulb temperature. This bridge which is designated in general by "D" may be conveniently termed "the dry bulb bridge". There is also provided a similarly arranged Wheatstone bridge comprising wet resistance thermometer 29 and balancing slide wires 13—14 and 15—16. Upon a movement of points 37 and 38 along slide wires 13—14 and 15—16 to balance the bridge, the bridge measures wet bulb temperature. This bridge is designated in general by "W" and may be conveniently termed "the wet bulb bridge".

For the purpose of operating these bridges there is provided a supply battery B and a balancing galvanometer G which may be transferred from one bridge to another by means of relay 39. As is apparent from the circuit arrangement shown the battery B and the galvanometer G are operatively connected to the dry bulb bridge D when relay 39 is in the non-operated position and are operatively connected to the wet bulb bridge W when relay 39 is in the operated position. By means of power furnished by motor actuated mechanism L, which will be referred to later, shaft 217 is driven at constant speed and by means of spiral gears 13' and 14' rotates shaft 15' at constant speed. With shaft 15' in the position shown, brush 25 is in contact with the insulating section 40 of commutator 18 and hence relay 39 is in the non-operated position as shown. In this condition the dry bulb bridge is operative and points 2 and 3 are shifted along their respective slide wires by means of power furnished by mechanism L and controlled by the deflection of galvanometer G. The mechanism for moving points 2 and 3 in response to the deflection of galvanometer G forms no part of the present invention and hence a detailed description of this mechanism is not believed to be necessary. This mechanism is described in the U. S. patent to Leeds No. 1,125,699, January 19, 1915.

During the time that dry bulb bridge D is being balanced to measure dry bulb temperature, a mechanism which will be described later is operating to position the recording pen 22 across chart 23 to indicate the value of dry bulb temperature. After sufficient time has elapsed to permit the bridge to be balance, cam 16' allows lever 20 to momentarily descend and lower pivoted rod 21 which permits recording pen 22 to come in contact with the chart 23, thus recording the dry bulb temperature. Pen 22 is not attached to rod 21', but slides along on rod 21 which runs parallel to the axis of roll 24, being bent perpendicular thereto at each end of roll 24 and then bent again to permit its being pivoted to supports 21'', only one of which is shown.

After pen 22 has been raised from the chart the conducting segment of commutator 18 makes contact with brush 25, thus completing a circuit from grounded battery 42, relay 39, brush 25 shaft 15' and slip ring 26 to ground, thereby bringing the relay into the operated position. As is obvious from the circuit arrangement, this operatively connects galvanometer G and supply battery B with the wet bulb bridge W.

Wet bulb bridge W is balanced by shifting points 37 and 38 along their respective slide wires in the same manner as dry bulb D was balanced. This measures the dry bulb temperature and during the time that the measurement is being made a mechanism which will be described later operates to position pen 32 along chart 23 so as to indicate the value of relative humidity corresponding to the value of dry bulb temperature measured by bridge D and the value of wet bulb temperature measured by bridge W. Pen 32 is similarly arranged to pen 22 and after a sufficient time has elapsed to permit bridge W to become balanced, cam 17 permits a momentary descent of lever 31 which allows pen 32 to come in contact with the chart 23 thereby recording the value of relative humidity corresponding to the measured temperature values.

After pen 32 has been raised from the chart commutator 18 breaks the circuit through the winding of relay 39, thus allowing the relay to return to the non-operated position which leaves the apparatus in the initial condition. Another cycle is immediately started and points are successively plotted upon record sheet 23 showing the dry bulb temperature and relative humidity. Record sheet 23 is advanced by roller 24 at a uniform rate by means such as the one which will be described later.

Referring to Figs. 2 and 5 cam 50 is constructed with axial distances corresponding to dry bulb temperature and each cross section taken in a plane perpendicular to the axis representing a polar curve of relative humidity plotted as radii against wet bulb temperature as angle θ. Thus, for example, the end 51 of the cam corresponds to a definite dry bulb temperature and the profile of the end as shown in Fig. 5 is a polar curve of relative humidity plotted as radii against wet bulb temperature plotted as angle θ. Suppose that end 51 of the cam corresponds to a temperature of 110° F, the radius vector $OX_1$ represents 100% humidity and any other radius vector $OX_3$ represents, to the same scale, the relative humidity corresponding to a dry bulb temperature of 110° F and a wet bulb temperature represented by the polar angle $θ_1$. Looking at the curve of Fig. 5 from a position in front of the paper, the angle θ is considered to progress positively in a counter-clockwise direction from the radius vector $OX_2$ and an angle of zero represents a wet bulb temperature corresponding to the lowest value of wet bulb temperature which the apparatus will measure. As angle θ increases, the value of the wet bulb temperature increases until when $θ=θ_2$ (Fig. 5) the wet bulb temperature is equal to 110° F., which is the same as the dry bulb temperature corresponding to end 51, and hence the radius vector $OX_1$ at end 51 represents a relative humidity of 100%.

The cam 50 is so shaped that on a cross section taken in any plane parallel to end 51, the surface line of the cam will be a polar curve of relative humidity for some definite dry bulb temperature, the curve being plotted with relative humidity as radii against wet bulb temperature as angle θ. The dry bulb temperature is given by the distance of the cross sectional plane from the end of the cam. For example, end 51 may correspond to a temperature of 110° F. and end 52 to a temperature of 50° F., in which case, the length of the cam represents a scale of dry bulb temperature from 50° F. to 110° F.

It is seen that this cam is so shaped that every point upon its surface corresponds to a value of relative humidity and that values of humidity will be represented for all values of dry bulb temperature between the temperatures corresponding to end 51 and end 52 of the cam, respectively. By selecting a suitable scale of polar angles to represent the wet bulb temperature, the surface of the cam may be made to represent humidity over any desired wet bulb temperature range.

For any dry bulb temperature and any wet bulb temperature within the range for which cam 50 is constructed, there may be selected one point upon the surface of the cam, the dry bulb temperature being given by the perpendicular distance of the point from the plane of one end of the cam, and the wet bulb temperature being given by angle θ (see Fig. 5). The radial distance at this point from the origin O which is the center of shaft 53 gives directly the value of relative humidity.

The mechanism associated with the cam will now be described. Cam 50 is slidably mounted upon square sleeve 54, which in turn, is rotatably mounted upon shaft 53, journaled in supporting members 55 and 56. Cam 50 is positioned on sleeve 54 between two collar members 57 and 58 from which depends standards 59 and 60 which are rigidly secured together by members 61'. A drum 61 carrying pulleys 62 and 63 is mounted upon shaft 53 so as to be normally free to rotate about the shaft but to be incapable of longitudinal movement relative thereto. A cord 64 having one end secured to standard 59 passes over pulley 65, pulley 63 secured to drum 61, pulley 66 and pulley 67 having the other end secured to standard 60. It is thus seen that as drum 61 rotates standards 59 and 60 are moved longitudinally with respect to sleeve 54, thus giving cam 50 a longitudinal position on sleeve 54 which is dependent upon the angular position of drum 61.

Drum 61 carries slide wires 9—10 and 11—12 which are the slide wires of the dry bulb bridge D shown schematically in Fig. 1; and these slide wires cooperate with fixed points 2 and 3 which are the points 2 and 3 in Fig. 1. Drum 61 has secured thereto a clutch member 71 adapted to cooperate with a complementary clutch member 72 which is splined to shaft 53, and adapted to be shifted into and out of engagement with the clutch member 71 by means of electromagnet 73 (see Figs. 2 and 1) and spring 74. When shaft 15' (Fig. 1) is in the position shown the clutch actuating electromagnet 73 is energized by current from grounded battery 75, thus causing clutch members 71 and 72 to be in engagement as shown in Fig. 2. In this condition drum 61 is locked to shaft 53 and rotates therewith. Under the control of the galvanometer G mechanism L rotates shaft 53 and with it drum 61 to balance the dry bulb bridge D which has its slide wires 9—10 and 11—12 carried by drum 61. The mechanism shown diagrammatically and designated by L is the previously mentioned mechanism disclosed in the previously mentioned patent to Leeds No. 1,125,699, January 19, 1915.

It is apparent that when the dry bulb bridge has become balanced the angular position of drum 62 will be a measure of the dry bulb temperature and hence cam 50 which is moved longitudinally in accordance with the rotation of drum 61 will be in a longitudinal position which is a measure of dry bulb temperature. Pointer 76 which is in constant contact with the surface of cam 50 and which is movable only radially with respect to the cam will, therefore, make contact on the cam in a cross sectional plane which corresponds to the value of dry bulb temperature measured by the dry bulb bridge.

As shaft 15' continues to rotate, brush 77 engages the insulating portion 78 of commutator 79, thus breaking the circuit to clutch actuating magnet 73 and allowing spring 74 to disengage the clutch members 71 and 72. This leaves drum 61 disengaged from shaft 53 and hence any further rotation of the shaft will not alter the position of drum 61.

As shaft 15' continues to rotate brush 25 engages the conducting segment 18 of commutator 40, thus completing a circuit from grounded battery 80, through clutch actuating magnet 81 (see Figs. 1 and 2), and causing the engagement of clutch surfaces 82 and 83. This locks drum 70 to shaft 53 in the same manner as drum 61 was locked to the shaft. At the same time that clutch actuating magnet 81 is energized, relay 39 (Fig. 1) is operated by current over an obvious circuit, thus transferring galvanometer G and battery B to the wet bulb bridge and rendering it operative. The slide wires 13—14 and 15—16 are carried by drum 70 and cooperate with fixed points 37 and 38, respectively; and hence the wet bulb bridge W will be balanced due to the rotation of drum 70 by power furnished by mechanism L in response to the deflection of galvanometer G. It is apparent that when the bridge becomes balanced the angular position of drum 70 will be a measure of the wet bulb temperature and since drum 70, square sleeve 54 and cam 50 all rotate together, cam 50 will be positioned angularly in accordance with the wet bulb temperature. The arrangement of the cam relative to pointer 76 is such that when drum 70 has been so positioned as to balance the wet bulb bridge W, the angle $\theta$ measured from the radius vector $OX_2$ to the radius vector passing through pointer 76 will correspond to the measured value of wet bulb temperature. Since the length of the radius vector passing through pointer 76 is a measure of the relative humidity, pointer 76, and rod 85 on which pointer 76 is mounted, will be positioned in accordance with the value of relative humidity corresponding to the measured values of dry bulb and wet bulb temperatures.

Referring to Figs. 2, 3 and 5, it is seen that rod 85 is mounted so as to be free to move vertically and on the lower part of the rod is formed a rack 86 which engages a pinion 87 keyed to a horizontal shaft 88. Referring to Figs. 2 and 4, shaft 88 is journaled in supporting members 55 and 56. Secured to supporting member 55 is a casing 89 in which there is a spiral spring 89' having one end secured to the casing and the other end attached to shaft 88, the spring being arranged to bias the shaft so as to maintain pointer 76 in contact with cam 50.

Fixedly secured to the end of shaft 88 is a pulley 90 around which passes an endless cord 90' that also passes around pulleys 91 and 92 and carries a recording pen 32. It is seen that the mechanism by which recording pen 32 is associated with pointer 76 will cause the pen 32 to take up a position adjacent the chart 23 which corresponds to the position given point 76 by the radius of cam 50. Hence, the position of pen 32 across chart 23 will indicate directly the value of relative humidity corresponding to the measured values of dry bulb and wet bulb temperature. Pen 32 shown in Figs. 2 and 4 is the same as pen 32 shown schematically in Fig. 1 and the mechanism by which the pen is raised and lowered is contained in that designated by L in Fig. 2.

Pen 22 shown in Figs. 2 and 4 is the same as pen 22 shown in Fig. 1 and is attached to an endless cord 100 which passes over a series of pulleys as shown, including pulley 62 secured to drum 61 carrying the balancing slide wires of the dry bulb bridge D. Drum 61 being so positioned upon a balance of bridge D as to measure directly the value of dry bulb temperature, pen 22 is likewise positioned relative to chart 23 and hence will plot the measured value of dry bulb temperature when it is momentarily lowered into contact with chart 23 following a balance of the dry bulb bridge. Chart 23 is advanced at uniform speed by any suitable mechanism such as shaft 108 connected with the motor driven mechanism L; and since points are periodically plotted at frequent intervals showing dry bulb temperature and relative humidity a record will be obtained upon which there are curves of dry bulb temperature and relative humidity plotted against time.

These curves may be plotted by means of this apparatus over an extended period of time without requiring the attention of an operator except for occasionally renewing chart 23, refilling pens 22 and 32, etc. To facilitate the selection of values from the finished record, it is preferable that the chart be printed with two scales of ordinates, one for temperature and the other for humidity.

What is claimed is:

1. A device for determining the value of a quantity which is a function of two variables, comprising a geometrical surface representing the quantity as a function of the two variables, means comprising an electrical bridge to measure the first variable, means associated with said bridge to move the surface according to the measured value of the first variable without altering its position relative to the coordinates of the second variable, means comprising an electrical bridge to measure the second variable, and means associated with the second bridge to move the surface according to the measured value of the second variable without altering its position relative to the coordinates of the first variable.

2. A device for determining the value of a quantity which is the function of two variables, comprising a geometrical surface representing the quantity as a function of the two variables, means comprising an automatically balanced electrical bridge to measure the first variable, means associated with said bridge to move the surface according to the measured value of the first variable without altering its position relative to the coordinates of the second variable, means comprising a second automatically balanced electrical bridge to measure the second variable, means associated with said second bridge to move the surface according to the measured value of the second variable without altering its position relative to the coordinates of the first variable, curve drawing means for recording the value of the quantity to be determined and means cooperating with said surface to control said curve drawing means.

3. A recording device, comprising a geometrical surface representing relative humidity as a function of two variables, means comprising an electrical bridge to measure the first variable, means associated with said bridge to move said surface according to the measured value of the first variable without altering its position relative to the coordinates of the second variable, means comprising an electrical bridge to measure the second variable, means associated with said bridge to move the surface according to the measured value of said variable without altering its position relative to the coordinates of said first variable, means for recording the value of relative humidity, means cooperating with said surface to control said recording means, and means for recording the value of said one of the variables.

4. A device for determining the value of relative humidity; which comprises a geometrical surface representing a quantity as a function of two variables, said surface being mounted on a member with respect to which it is movable relative to the coordinates of one of the variables, and said surface and said member being movable together relative to the coordinates of the other of said variables; means comprising an electrical bridge for measuring one of the variables; means associated with said bridge to move said surface relative to said member; means comprising an electrical bridge to measure the second of said variables; means associated with said bridge to move together said member and said geometrical surface, means for indicating the value of relative humidity; and means cooperating with said surface to control said indicating means.

5. A device for recording the value of relative humidity; comprising a geometrical surface representing relative humidity as a function of two variables, said surface being mounted upon a member with respect to which it is movable relative to the coordinates of one of the variables, and said surface and the member being movable together relative to the coordinates of the other of said variables; means comprising an automatically and periodically balanced electrical bridge to measure one of the variables; means associated with said bridge to move said surface relative to said member; means comprising an automatically and periodically balanced electrical bridge to measure said second variable; means associated with said bridge to move said member; means for recording the value of relative humidity; and means cooperating with said surface to control said recording means.

In witness whereof, I hereunto subscribe my name this 22nd day of October, A. D. 1923.

JAMES C. WRIGHT.